(12) United States Patent
Hofmann et al.

(10) Patent No.: US 9,039,263 B2
(45) Date of Patent: May 26, 2015

(54) EXTENDIBLE AND PIVOTABLE BICYCLE RACK

(71) Applicant: GM GLOBAL TECHNOLOGY OPERATIONS LLC, Detroit, MI (US)

(72) Inventors: Hendrik Hofmann, Klein-Winternheim (DE); Dirk Lungershausen, Wiesbaden (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 216 days.

(21) Appl. No.: 13/723,546

(22) Filed: Dec. 21, 2012

(65) Prior Publication Data

US 2013/0182454 A1 Jul. 18, 2013

(30) Foreign Application Priority Data

Dec. 21, 2011 (DE) .......................... 10 2011 121 776

(51) Int. Cl.
| | | |
|---|---|---|
| *B60Q 1/30* | (2006.01) | |
| *B60R 9/10* | (2006.01) | |
| *B60Q 1/26* | (2006.01) | |
| *B60R 9/06* | (2006.01) | |
| *F21V 23/04* | (2006.01) | |

(52) U.S. Cl.
CPC ................ *B60Q 1/2661* (2013.01); *F21V 23/04* (2013.01); *B60Q 1/307* (2013.01); *B60R 9/10* (2013.01); *B60R 9/06* (2013.01)

(58) Field of Classification Search
CPC .......... B60N 3/102; B60R 9/06; B60R 9/065; B60R 9/10; B60R 5/041; B60Q 1/2661; B60Q 1/302; B60Q 1/305; B60Q 1/307; B60P 1/4464; F21S 48/25; F21S 48/255; F21S 48/30; F21V 23/04
USPC ......... 224/281, 282, 495–499, 502, 504–508, 224/510, 521, 553, 554, 924; 280/769; 340/431; 362/394, 485, 540, 541, 549
See application file for complete search history.

(56) References Cited

U.S. PATENT DOCUMENTS

| | | | | |
|---|---|---|---|---|
| 1,482,770 | A * | 2/1924 | Terrell ........................... | 224/500 |
| 3,176,903 | A * | 4/1965 | Farley ........................... | 224/490 |
| 7,121,597 | B2 * | 10/2006 | Chuang ......................... | 293/117 |
| 7,535,346 | B2 * | 5/2009 | Kalous .......................... | 340/431 |
| 7,806,307 | B2 * | 10/2010 | Bergerhoff et al. ........... | 224/496 |
| 7,854,358 | B2 | 12/2010 | Begerhoff et al. | |

(Continued)

FOREIGN PATENT DOCUMENTS

| | | |
|---|---|---|
| DE | 10257903 A1 | 6/2004 |
| DE | 102004022835 A1 | 12/2005 |
| DE | 102007023495 A1 | 11/2008 |

(Continued)

OTHER PUBLICATIONS

German Patent Office, German Search Report for Application No. 102011121776.6, dated Sep. 6, 2007.

*Primary Examiner* — Alan Cariaso
(74) *Attorney, Agent, or Firm* — Ingrassia Fisher & Lorenz PC (57) ABSTRACT

A bicycle rack for arrangement on the rear end of a motor vehicle in an extendible fashion is provided. The bicycle rack includes a carrying frame, a slide-in element that is displaceably arranged in the carrying frame, and a carrier element that is pivotably arranged on the side-in element.

7 Claims, 7 Drawing Sheets

(56) References Cited

U.S. PATENT DOCUMENTS 7,857,180 B2    12/2010   Bergerhoff et al.
2007/0102465 A1*   5/2007   Wezyk et al. .................. 224/321

FOREIGN PATENT DOCUMENTS

DE    202008013542 U1   12/2008
DE    102008006814 A1   1/2009

* cited by examiner

EXTENDIBLE AND PIVOTABLE BICYCLE RACK

CROSS-REFERENCE TO RELATED APPLICATION

This application claims priority to German Patent Application No. 10 2011 121 776.6, filed Dec. 21, 2011, which is incorporated herein by reference in its entirety.

TECHNICAL FIELD

The technical field relates to a bicycle rack for being arranged on the rear end of a motor vehicle.

BACKGROUND

A bicycle rack is known from Utility Model DE 20 2008 013 542 U1. The bicycle rack disclosed in this publication features a fork-shaped carrier frame, on which two holding arms for supporting a load to be carried are arranged, as well as a mounting device for mounting the carrier frame on the vehicle. The bicycle rack furthermore features two pivotable taillights that are arranged in respective end regions of the holding arms. In this case, the two taillights are arranged in the respective end regions of the holding arms such that they can be pivoted into an inner area of the carrier frame that lies between the holding arms.

It is at least an objective herein to provide a bicycle rack for a motor vehicle that is arranged on the rear end of the motor vehicle and makes it possible to open a tailgate.

SUMMARY

In accordance with an exemplary embodiment, a bicycle rack is proposed that is arranged on the rear end of a motor vehicle in an extendible fashion and features:
  a carrying frame
  a slide-in element that is displaceably arranged in the carrying frame, and
  a carrier element that is pivotably arranged on the side-in element.

The carrier element can be pivoted into a loading position in order to open the luggage compartment. Consequently, the luggage compartment also remains accessible if bicycles are fixed on the bicycle rack. The carrier element can be once again pivoted into an operating position after the luggage compartment has been loaded. In this context, the operating position is the position that the bicycle rack assumes while the vehicle is in motion. Any bicycles fixed on the carrier element can remain on the carrier element. Other objects naturally may also be arranged and fixed on the bicycle rack.

In another embodiment, the bicycle rack features lighting units that are arranged on and pivot together with the carrier element, as well as a bicycle rack switch that is arranged in such a way that it is closed in the operating position and opened in a retracted position, in which the slide-in element is arranged in the carrying frame.

In this way, the bicycle rack switch is automatically closed and the lighting units are activated when the slide-in element is pulled out of the carrying frame.

In one embodiment, the bicycle rack switch is arranged in such a way that it deactivates an electrically conductive connection between a power supply for the vehicle lights and the lighting units when the carrier element is pivoted from the operating position into the loading position. In this embodiment, the bicycle rack may furthermore feature a taillight switch that is arranged in such a way that it activates an electrically conductive connection between a power supply for the vehicle lights and taillight units on the vehicle when the carrier element is pivoted from an operating position into a loading position.

This embodiment is based on the notion that the lighting units point downward and therefore no longer directly illuminate approaching vehicles when the carrier element is pivoted. Consequently, the lighting units are deactivated and the taillight units on the vehicle are activated instead.

The bicycle rack switch used preferably consists of a reed relay, wherein the bicycle rack switch is moved into the proximity of a permanent magnet in the loading position.

A reed relay is able to close an electric contact under the influence of a magnetic field. A magnetic field can be made available by a second permanent magnet. The reed relay may be accommodated in a hermetically sealed housing and operate in an essentially wear-free fashion. As the taillight switch moves into the magnetic field of the permanent magnet when the carrier element is pivoted, it closes and interrupts an electrically conductive connection between the power supply for the vehicle lights and the taillight units.

In another embodiment, the bicycle rack switch used may consist of a reed relay, wherein the bicycle rack switch abuts on a permanent magnet in the operating position.

Due to this measure, the bicycle rack switch is initially closed, i.e., electrically conductive, when the carrier element is in the extended operating position. In this way, the lighting unit on the bicycle rack is activated. The second permanent magnet may furthermore be positioned in such a way that the lighting unit is activated when the carrier element is extended, namely no later than at the time, at which the lighting units are extended.

In another embodiment, the lighting units are arranged on the carrier element in such a way that they can be retracted, wherein the lighting units are connected to the bicycle rack switch in an electrically conductive fashion with the aid of switching means when they are extended.

Due to this measure, the lighting units are immediately operational once they are extended. The switching means may be realized in the form of loops that produce an electric contact starting at a certain pivoting angle. The switching means may furthermore be realized in the form of pushbuttons with an element that can be depressed, wherein the element is depressed when the lighting units are extended and thusly produces an electric contact. The switching means may furthermore consist of a reed relay that operates in the above-described fashion.

The activation of the taillight units and the deactivation of the lighting unit during the pivoting of the carrier element naturally may also be realized with suitable signaling technology means. In this case, the bicycle rack features a sensor for registering when the carrier element is extended. The sensor may be suitably connected to means that initiate the activation of the taillight units and the deactivation of the lighting unit.

The carrier element preferably can be pivoted away from the vehicle in a plane that is defined by a vertical vehicle axis and a longitudinal vehicle axis.

Due to these measures, the tailgate can be opened when the carrier element is pivoted. The vehicle may consist of a sedan in fastback form, a station wagon or a hatchback-type compact car. Accordingly, the luggage compartment lid may also consist of the tailgate of a station wagon or a compact car.

In another embodiment, a bicycle rack is arranged on the rear end of a motor vehicle in an extendible fashion and features:

a carrying frame a slide-in element that is displaceably arranged in the carrying frame, an extendible bail carrier that is arranged on the bicycle rack and features a holding frame, as well as end sections, and locking means that are designed for locking the bail carrier in an extended state, wherein the end sections abut on limit stops in an extended state.

One final position of the bail carrier, in which it is completely extended, is defined in that the end sections abut on the limit stops. The end sections cooperate with the limit stops and thusly make it possible to realize a solid final position, in which the locking means can engage. During the operation, the main stress is exerted upon the bail carrier in the direction, in which the bail carrier is extended. The limit stop therefore also serves for absorbing forces acting upon the bail carrier and thusly reduces the stress on the locking means.

In one embodiment, the locking means are realized in the form of a pivotable detent pawl that in the extended state acts upon guide sections extending out of the holding frame and locks the guide sections in a locking groove.

Due to these measures, the bail carrier is positively held in the extended state.

According to another embodiment, a guide link is arranged on the detent pawl, wherein the guide link is realized in such a way that the detent pawl is deflected during an extension process such that the guide sections can slide into the locking grooves.

In this way, a locking arrangement is realized that automatically engages and secures the bail carrier during the extension thereof.

In another embodiment, securing means are furthermore arranged on the bicycle rack, wherein said securing means are realized in the form of two retractable securing bolts that can be engaged in correspondingly designed recesses in the extended state.

In this way, the user can additionally secure the bail carrier such that the stress on the locking means is reduced during the operation.

In another embodiment, the securing bolts respectively feature gearings that mesh with a rotatably supported pinion gear on both sides, wherein the pinion gear can be externally driven.

The locking bolts can be moved into the recesses by turning the pinion gear. In this way, the bail carrier is additionally secured in its extended position.

In another embodiment, the bail carrier is realized in the form of a tube that is bent in a U-shaped fashion and the ends of which form the end sections. In this case, the tube may consist of aluminum or aluminum alloys.

According to another embodiment, the holding frame is realized in the form of a plastic housing, in which the end sections are accommodated.

BRIEF DESCRIPTION OF THE DRAWINGS

The various embodiments will hereinafter be described in conjunction with the following drawing figures, wherein like numerals denote like elements, and wherein.

DETAILED DESCRIPTION

The following detailed description is merely exemplary in nature and is not intended to limit the various embodiments or the application and uses thereof. Furthermore, there is no intention to be bound by any theory presented in the preceding background or the following detailed description.

In the figures, identical or functionally identical components are identified by the same reference symbols.

Figure 1:
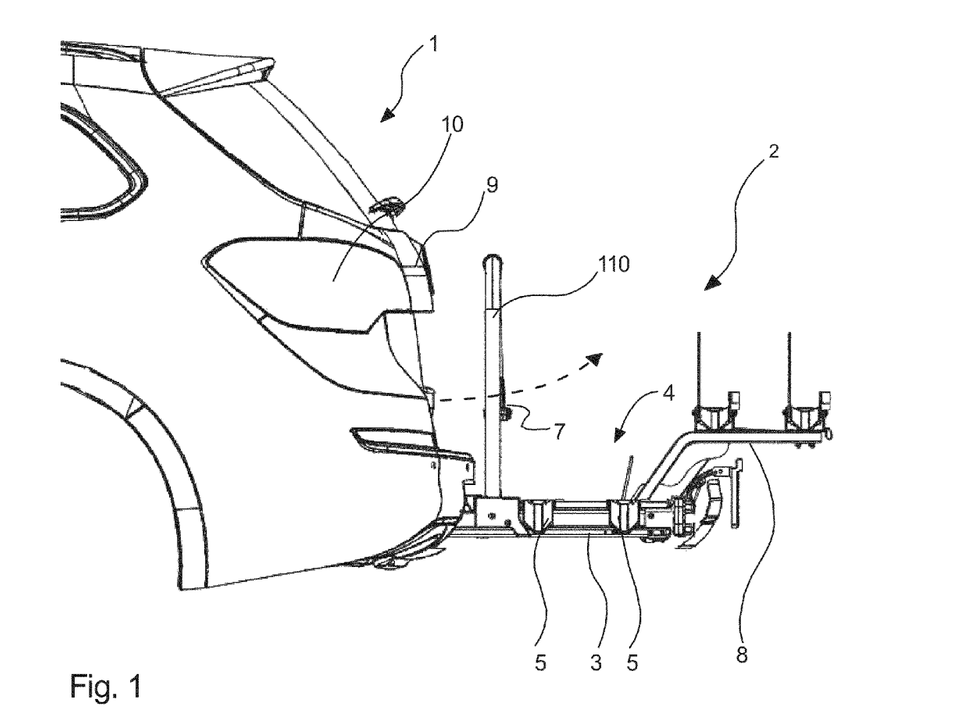
FIG. 1 is a side view of the rear end of a motor vehicle with an extended bicycle rack in accordance with an exemplary embodiment.
Figure 5:
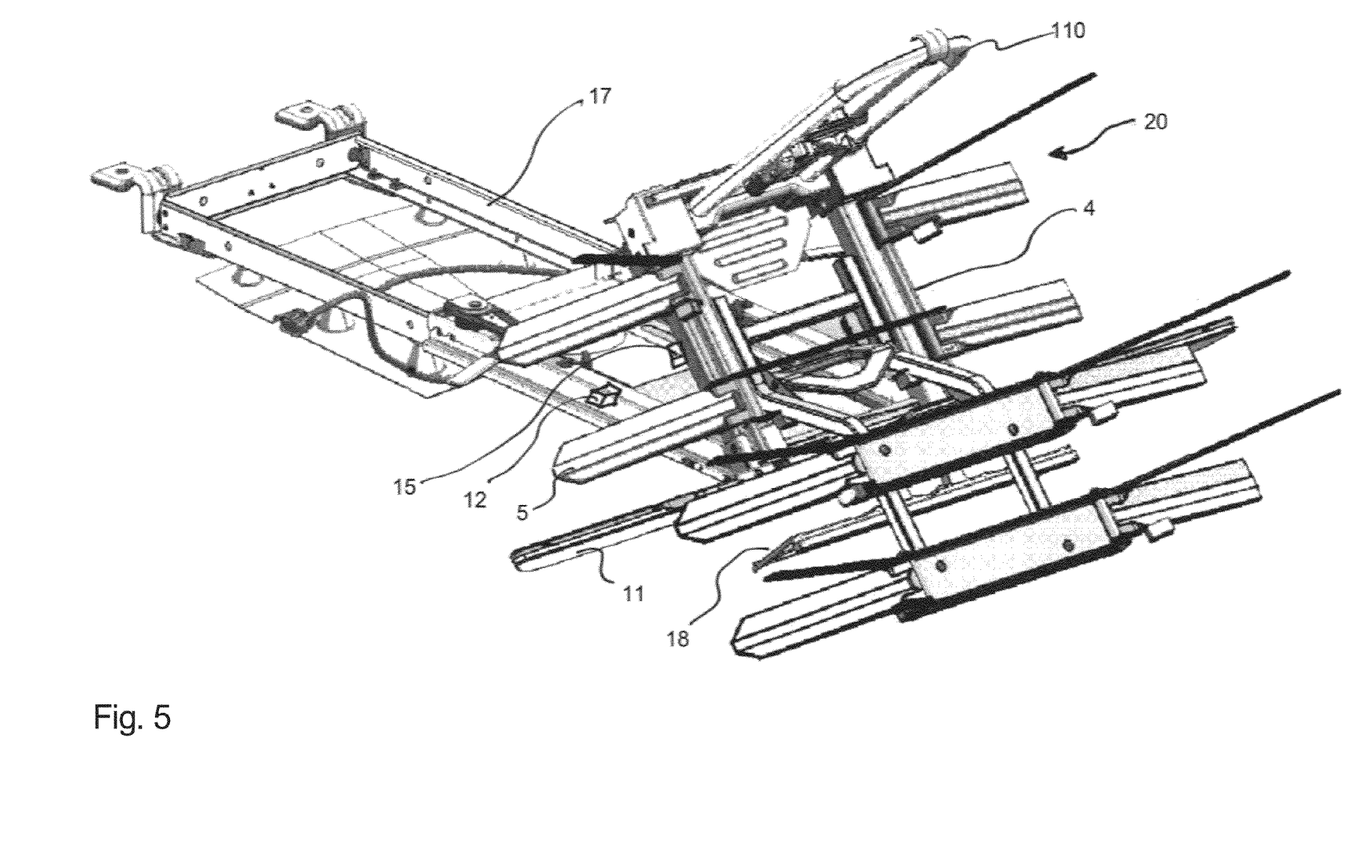
FIG. 5 shows a bicycle rack in a loading position, in which the carrier element is pivoted away toward the rear, in accordance with an exemplary embodiment.

FIG. 1 shows a side view of the rear end of a motor vehicle 1 with an exemplary extended bicycle rack 2 arranged thereon. The bicycle rack 2 features a slide-in element 3 that can be completely pushed into the vehicle 1 together with all attachments. A carrier element 4 is arranged on the slide-in element 3 and features pivotable U-profiles 5, as well as a bail carrier 110. The U-profiles 5 are designed for accommodating the wheels of a not-shown bicycle. The bicycle can be fixed by means of pivotable fastening element 7 arranged on the bail carrier 110. Two U-profiles are arranged on the bicycle rack 2 on both sides of the carrier element 4 in order to accommodate two bicycles behind one another. An auxiliary carrier 8 with four additional U-profiles 5 may be attached to the carrier element 4 in order to accommodate two more bicycles. A tailgate 9 that can be pivoted upward is arranged on the rear end of the vehicle 1. In the operating position, the bicycle rack 2 lies directly in the moving path of the tailgate 9 that is indicated with a broken line. This is the reason why the carrier element 4 can be pivoted toward the rear as illustrated in FIG. 5.

In an embodiment, the vehicle 1 furthermore features taillight units 10 that can be activated with the aid of a light switch in the passenger compartment. The taillight units 10 may feature functional lights such as a taillight, a rear fog light, a brake light and a turn signal. Lighting units 11 that are switched on when the bicycle rack 2 is extended and also feature the aforementioned functional lights are arranged on the bicycle rack 2. The functional lights may be realized in the form of a plurality of light-emitting diodes (LEDs) that can be activated in groups.

Figure 2:
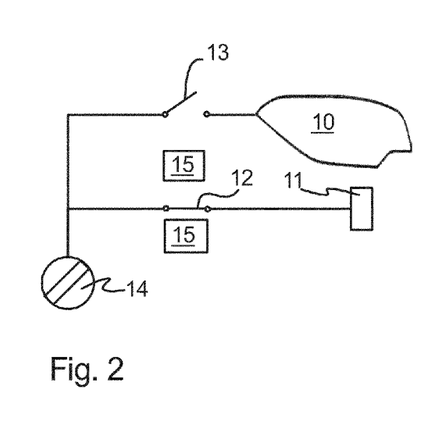
FIG. 2 schematically shows a switching arrangement for controlling a taillight unit and a lighting unit in accordance with an exemplary embodiment.

FIG. 2 shows a highly schematic representation of a switching arrangement with deactivated taillight units 10 and activated lighting unit 11 in accordance with an embodiment. In order to simplify the illustration, only one switch 12 and 13 is respectively illustrated in a representative capacity for the numerous functional lights that can be independently controlled in the taillight units 10 and in the lighting units 11, wherein this figure also shows only a positive pole of the power supply. When the bicycle rack 2 is in the operating position, a bicycle rack switch 12 is closed and the lighting unit 11 is activated as long as a power supply 14 for the vehicle lights delivers a corresponding signal. A taillight switch 13 that can connect the taillight units 10 to the power supply 14 for the vehicle lights in a signaling or electrically conductive fashion is opened.

Figure 3:
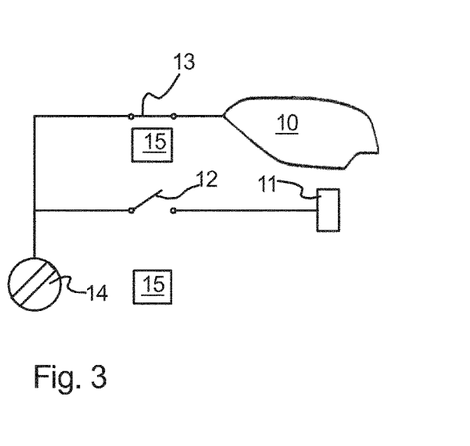
FIG. 3 schematically shows the switching arrangement according to FIG. 2 with an activated taillight unit and a deactivated lighting unit in accordance with an exemplary embodiment.

FIG. 3 schematically shows a state, in which the taillight units 10 are activated and the lighting unit 11 is deactivated. The bicycle rack switch 12 is opened and the taillight switch 13 is closed. The state shown in FIG. 3 is adjusted when the carrier element 4 is completely pushed into the vehicle 1. In addition, the state shown is also adjusted when the carrier element 4 is pivoted toward the rear in order to load the luggage compartment. To this end, the bicycle rack switch 12 and the backlight switch 13 may be realized in the form of reed contacts that close when they are moved into the proximity of a permanent magnet 15 and open when they are removed from the magnetic field of the permanent magnet 15.

Figure 4:
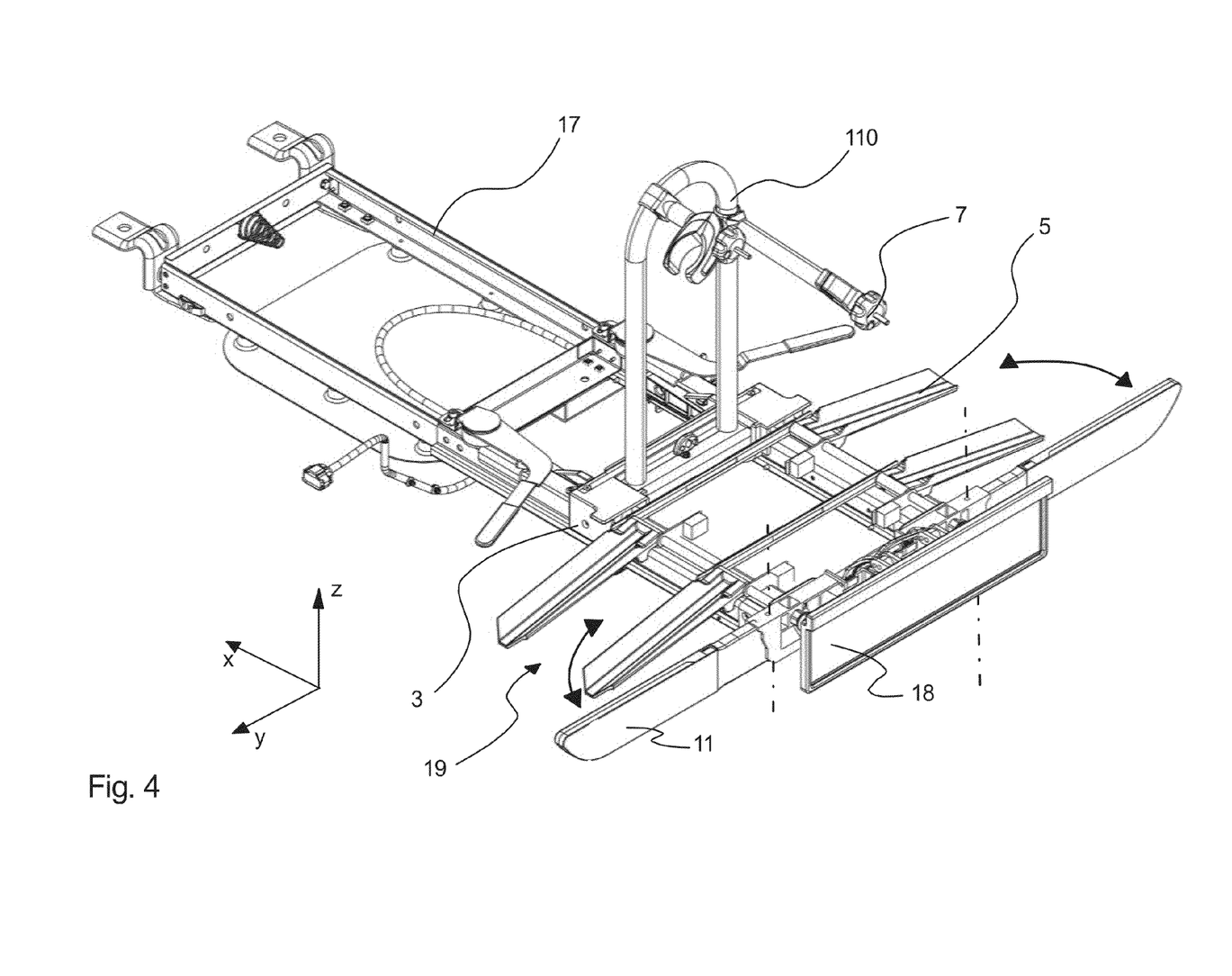
FIG. 4 shows a bicycle rack in an operating position, in which the lighting units are extended, in accordance with an exemplary embodiment

The permanent magnets 15 may be arranged on the bicycle rack 2 in such a way that the bicycle rack switch 12 closes and the taillight switch 13 opens when the carrier element 4 is pulled out or the lighting units 11 are extended (see FIG. 4) and the bicycle rack switch 12 opens and the taillight switch 13 closes when the carrier element is pivoted from the operating position 19 (FIG. 4) into the loading position 20 (FIG. 5). This may also take place simultaneously at more than two switches, wherein it is even possible to eliminate one permanent magnet 15 if the arrangement is realized accordingly. As seen in FIG. 4 and FIG. 5, the bicycle rack 2 is covered by an outer cover plate 18 in a state in which the slide-in element is pushed into the carrying frame.

FIG. 5 shows an exemplary arrangement of a bicycle rack switch 12 and a permanent magnet 15. When the carrier element 4 is pivoted, the permanent magnet 15 is moved away from the switch 12 such that the bicycle rack switch 12 opens and deactivates the lighting units 11.

The bicycle rack switch 12 may also be arranged in such a way that it is closed in the operating position and opened in a retracted position, in which the slide-in element 3 is arranged in the carrying frame 109. To this end, the permanent magnet 15 may be arranged, for example, on the end of the carrying frame 109 and the bicycle rack switch 12 may be arranged on the slide-in element 4 such that the bicycle rack switch 12 is moved into the proximity of the permanent magnet 15 or abuts on the permanent magnet 15 when the slide-in element 4 is pulled out.

Figure 6:
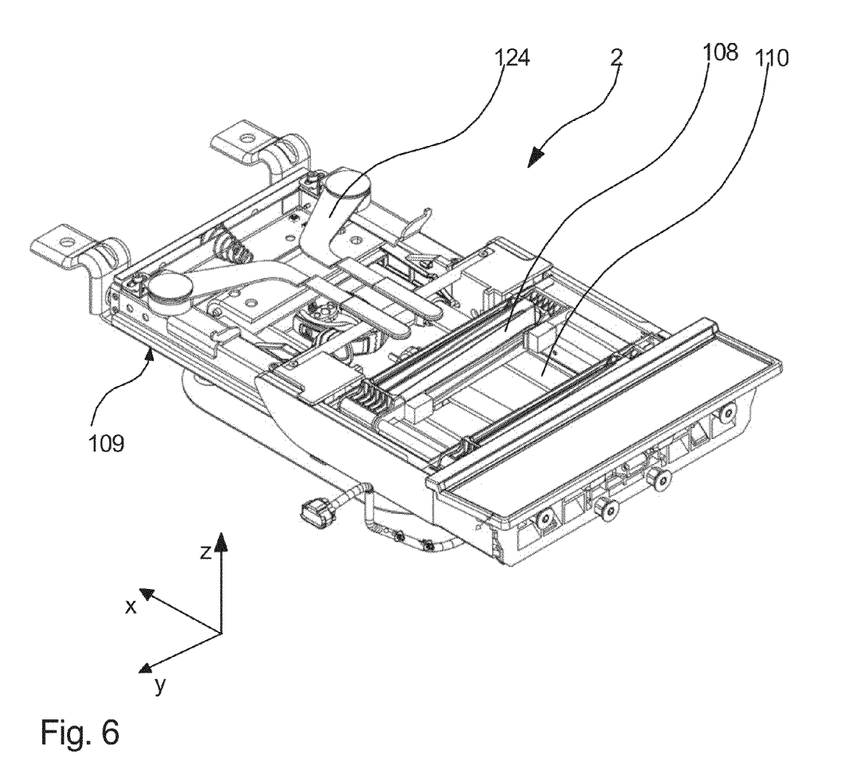
FIG. 6 shows a bicycle rack with retracted fastening elements, in accordance with an exemplary embodiment.

FIG. 6 shows the bicycle rack 2 outside the vehicle in the retracted state. This figure shows a carrier element 108 that is displaceably arranged on a carrying frame 109. The carrying frame 109 can be screwed to the vehicle 1. The entire bicycle rack 102 can be arranged in a suitable cavity provided in the vehicle 1 in the form of a cartridge. The carrier element 108 features fastening elements for accommodating a bicycle, an electric bicycle, a motorized bicycle or the like. One fastening element consists of a bail carrier 110 that is arranged in the carrier element 108 pivotably and movably in the longitudinal vehicle direction.

Figure 7:
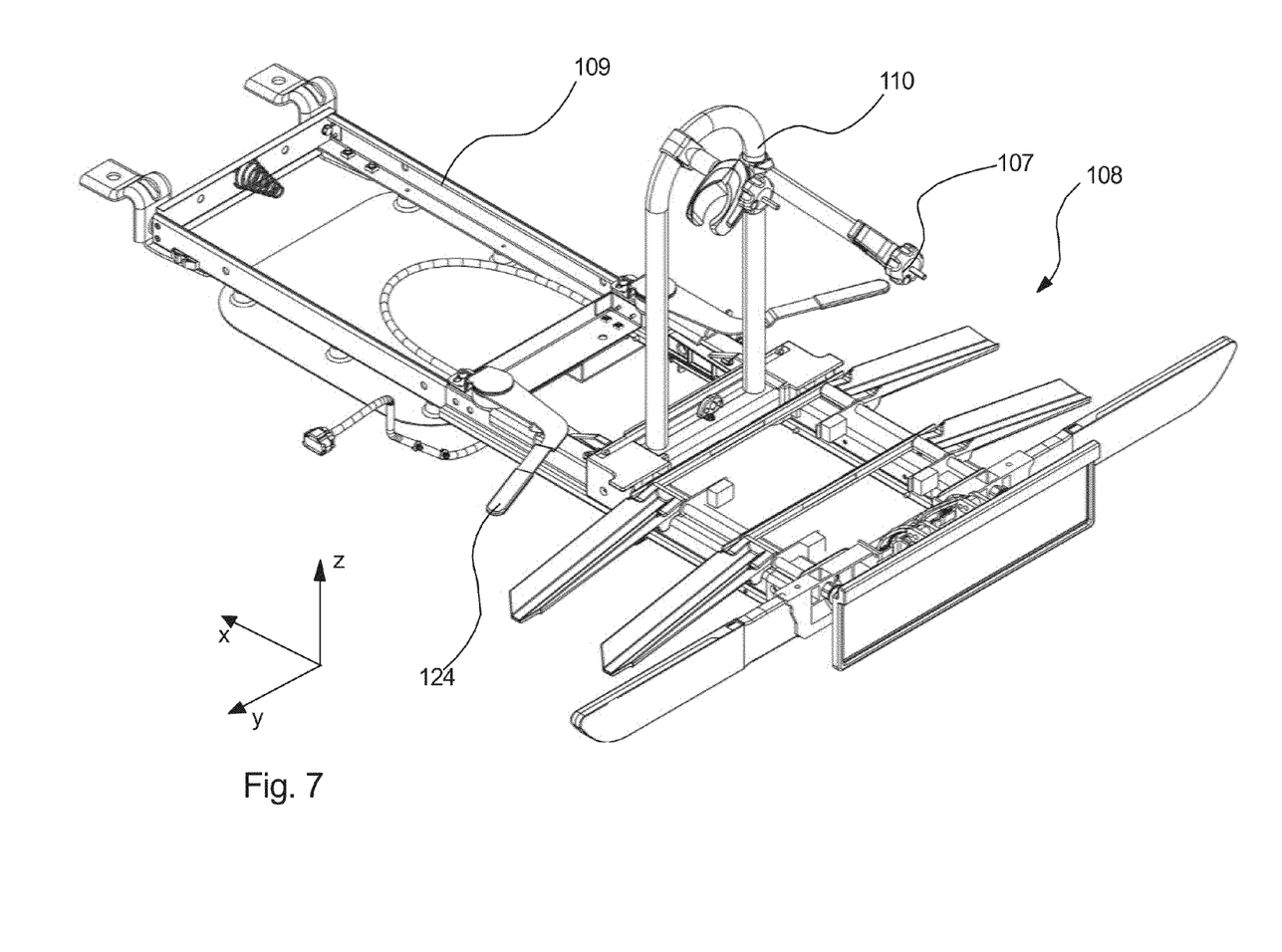
FIG. 7 shows a bicycle rack with extended fastening elements, in accordance with an exemplary embodiment.

FIG. 7 shows a bicycle rack 102 with completely extended bail carrier 110, in accordance with an embodiment.

Figure 8:
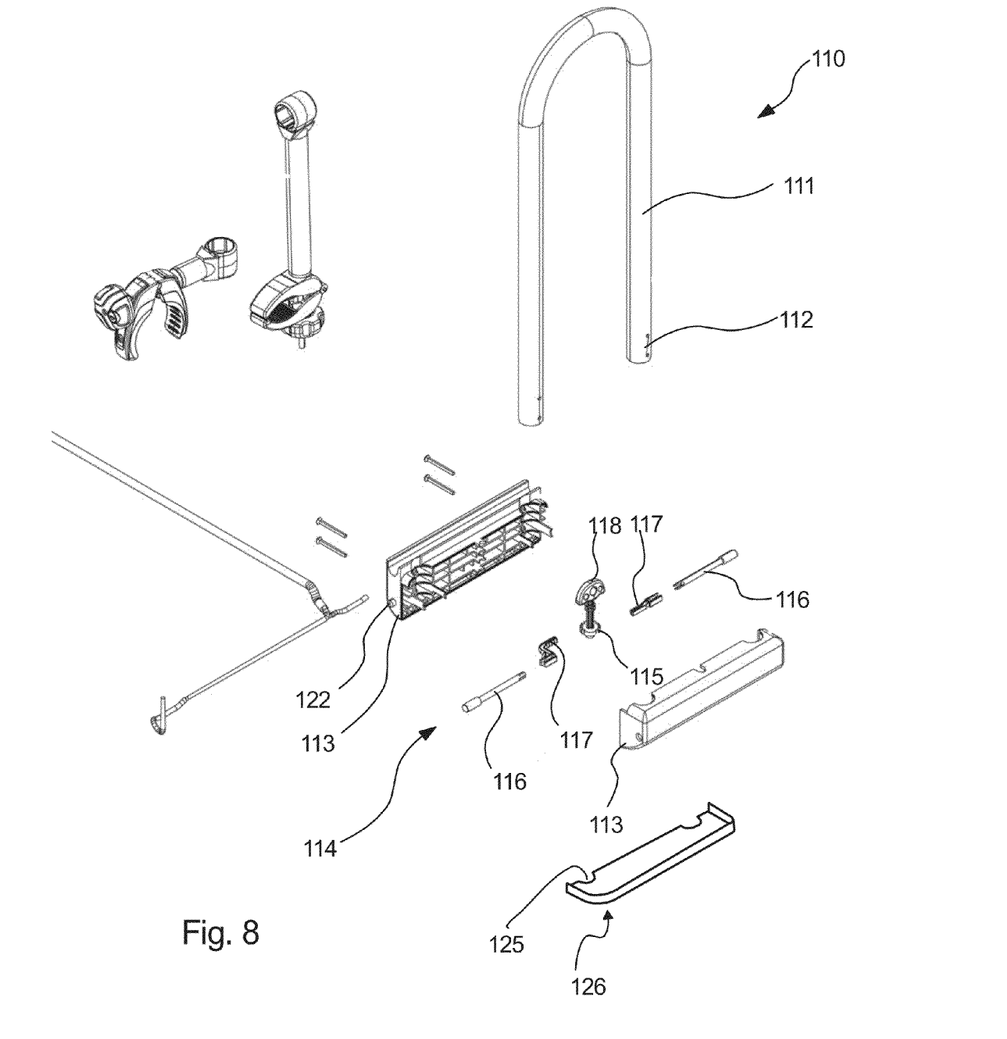
FIG. 8 shows an exploded view of a bail carrier in accordance with an exemplary embodiment.

FIG. 8 shows the elements of the bail carrier 110 in the form of an exploded view. The bail carrier 110 is essentially realized in the form of an aluminum tube 111 that is bent in a U-shaped fashion and features end sections 112. A two-part holding frame 113 of plastic encompasses the end sections 112 and forms a base for the end sections 112 of the bail carrier 110. The holding frame 113 is designed for accommodating securing means 114 therein. The securing means 114 consist of a pinion gear 115 and laterally extendable securing bolts 116 in this case. Gearings 117 are respectively arranged on the securing bolts 116 and mesh with the pinion gear 115 in the installed state. When the pinion gear is turned, the locking bolts 116 therefore move in an opposite direction. A handpiece 118 makes it possible to manually turn the pinion gear 115 in order to slide the locking bolts 116 into corresponding recesses 119 (see FIG. 9).

Figure 9:
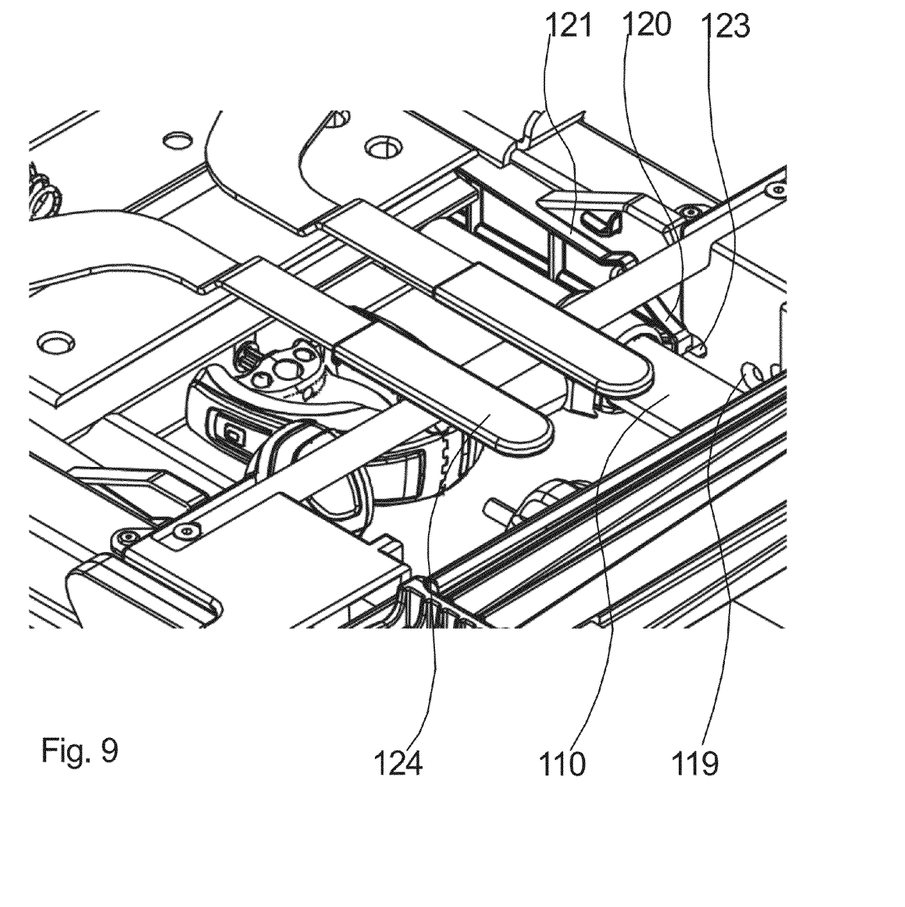
FIG. 9 shows a detail of the bicycle rack illustrated in FIG. 8.

FIG. 9, in particular, shows a detent pawl 120 that can be moved downward and is arranged on a guide link 121 in an embodiment. Guide sections 122 extend out of the holding frame 113 on both sides (see FIG. 8) and slide on the guide link 121 when the bail carrier 110 is pulled out and extended upward such that they press the detent pawl 120 downward and the guide sections 122 are able to slide into a locking groove 123 provided on the carrier element 108, wherein the detent pawl 120 subsequently snaps upward and securely holds the guide section in the locking groove 123. The detent pawl 120 may be unlocked, for example, by means of two locking levers 124.

FIG. 8, in an embodiment, furthermore shows limit stops 125, in which the end sections 112 are accommodated in the extended state. The limit stops 125 are arranged in a profile part 126. The profile part 126 is connected to the carrier element 108. In this way, the bail carrier 110 is held in a final position such that the locking means consisting of the detent pawl 120, the locking groove 123 and the guide sections 122 can engage. In addition, high forces acting opposite to the longitudinal vehicle direction X can be absorbed in the final position because the bail carrier 110 can be supported on the limit stops 125 with its end sections 112.

Although a few feasible embodiments of the invention were disclosed in the preceding description, it goes without saying that numerous other variations of embodiments can be realized with optional combinations of all technical characteristics and embodiments that were described above and, in particular, are obvious to a person skilled in the art. It furthermore goes without saying that the exemplary embodiments should merely be interpreted as examples that in no way restrict the scope of protection, the applicability and the configuration. In fact, the preceding description is intended to suitably instruct a person skilled in the art in realizing at least one exemplary embodiment. It also goes without saying that an exemplary embodiment can be modified in numerous ways with respect to the function and arrangement of its elements without deviating from the scope of protection disclosed in the claims and its equivalent.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A bicycle rack for arrangement on a rear end of a motor vehicle having vehicle tail lights in an extendible fashion, wherein the bicycle rack comprises:
   a carrying frame;
   a slide-in element that is displaceably arranged in the carrying frame;

a carrier element that is pivotably arranged on the slide-in element;

a bicycle rack lighting unit arranged on the carrier element; and at least one switching mechanism, the switching mechanism enabling the bicycle rack lighting unit and disabling the tail lights of the vehicle when the slide-in element is extended, and disabling the bicycle rack lighting unit and enabling the tail lights of the vehicle when the slide-in element is not extended.

2. The bicycle rack according to claim 1, further comprising a bicycle rack switch configured to be controlled by the at least one switching mechanism.

3. The bicycle rack according to one of claim 2, wherein the bicycle rack switch comprises a reed relay, and wherein the bicycle rack switch is moved away from the at least one switching mechanism in a loading position.

4. A bicycle rack for arrangement on a rear end of a motor vehicle in an extendible fashion, wherein the bicycle rack comprises:

a carrying frame;

a slide-in element that is displaceably arranged in the carrying frame;

a carrier element that is pivotably arranged on the slide-in element; and lighting units that are arranged on the carrier element, a bicycle rack switch that is arranged in such a way that it deactivates an electrically conductive connection between a power supply for lights of the motor vehicle and the lighting units when the carrier element is pivoted from an operating position into a loading position, and a taillight switch that is arranged in such a way that it activates an electrically conductive connection between the power supply for lights of the motor vehicle and taillight units on the motor vehicle when the carrier element is pivoted from the operating position into the loading position.

5. The bicycle rack according to claim 4, wherein the taillight switch comprises a reed relay, and wherein the taillight switch is moved away from a permanent magnet in the operating position.

6. The bicycle rack according to claim 4, wherein the lighting units are retractably arranged on the carrier element and electrically conductively connected to the bicycle rack switch with aid of switching means when they are extended.

7. The bicycle rack according to claim 1, wherein the bicycle rack is covered by an outer cover plate in a state in which the slide-in element is pushed into the carrying frame.

* * * * *